Patented Oct. 24, 1950

2,527,081

UNITED STATES PATENT OFFICE 2,527,081

PROCESS FOR PRODUCING POLYMERIC CONDENSATION PRODUCTS

John Ross, Ramsey, and Arthur Ira Gebhart, Union, N. J., assignors to Colgate-Palmolive-Peet Company, Jersey City, N. J., a corporation of Delaware No Drawing. Application August 28, 1946, Serial No. 693,570

3 Claims. (Cl. 260—78.5)

The present invention relates to a process for producing high yields of polymeric condensation products and, more particularly, to a new process for obtaining resinous condensation products.

The resin industry has for some time been conscious of the importance of maleic anhydride and of other acids and anhydrides having the alpha-beta-enal group C=C—C=O in the manufacture of synthetic resins. Easily polymerizable substances, such as vinyl compounds and olefinic derivatives having conjugated double bonds, have been subjected to condensation with maleic anhydride and other alpha-beta-enal compounds to form resinous polymers, and more recently it has been suggested that mono-olefins may also be employed in such condensations. The methods disclosed, however, in the case of mono-olefins and of olefinic materials having non-conjugated double bonds have produced mixtures of monomeric and polymeric condensation products which are difficult to separate into their components. No satisfactory method has been provided for substantially eliminating the monomers in a single operation, nor has the art shown a means for controlling the proportion of monomer to polymers.

It is an object of the present invention to provide a novel method for producing polymeric condensation products of non-conjugated olefinic compounds with aliphatic acids and acid anhydrides having an alpha-beta-enal group in relatively high yield.

It is another object of this invention to provide a new method of condensing mono-olefins with maleic anhydride to form polymers without substantial formation of monomeric condensation products.

Other objects and advantages of the invention will be apparent from the following description.

According to the present invention, the olefin and the unsaturated acid or anhydride are condensed in the presence of an added oxygen-yielding polymerization catalyst, such as a peroxide, especially benzoyl peroxide. The reaction mixture is heated to a temperature at which polymerization or resinification takes place.

Appreciable quantities of peroxide are present in normal olefins, usually amounting to at least 0.01% oxygen as peroxide oxygen. For this reason, condensation of olefins with maleic anhydride or other alpha-beta-enal compounds normally results in formation of some polymeric condensation products along with the monomeric compounds i. e. the simple condensation products formed. It has now been found, according to this invention, that an excess of the olefinic material (as distinguished from the unsaturated acid or anhydride) increases the proportion of polymeric substances formed. Thus, when using about three mols of hydrocarbon to one mol of maleic anhydride, a condensation product in which the monomer is substantially eliminated is formed. However, yields are low, and as most of the olefin is unreacted and must be recovered for recycling, this method of adding peroxide is not preferred.

The use of a small amount of an added oxygen-yielding polymerization catalyst with approximately stoichiometric amounts of the reactants also provides a condensation product consisting almost entirely of resinous polymeric substances. This has the advantage of giving a reaction mixture after condensation wherein a minimum amount of material other than the desired product is present, thus simplifying the procedure for isolating the polymer and permitting the use of smaller and less expensive equipment in recycling a far smaller proportion of the original reactants.

The compounds employed in the present reaction may be aliphatic or unsaturated alicyclic and either mono-olefins or non-conjugated polyolefins, and they may have straight or branched chains, although it is preferred to use normal straight chain olefins. They may be unsubstituted or may bear non-reactive substituent groups, including carbonyl, halogen, ether, alkyl and aryl groups. In general, it is preferred to employ olefins having about 8 to about 24 carbon atoms per molecule, and aliphatic olefins of about 8 to about 18 carbons have given particularly satisfactory results. Suitable olefins and olefin derivatives include decene, dodecene, hexadecene, docosene, and the like.

These olefinic materials may be condensed, upon addition of peroxide or other oxygen-yielding polymerization catalyst, with compounds having a double bond between two carbon atoms conjugated with one or more carbonyl or carboxyl groups. Such compounds are preferably aliphatic and contain up to about 7 carbon atoms per molecule, such as maleic or fumaric acid, acrylic acid, crotonic acid, itaconic acid, citraconic acid, etc., and their homologs, analogs, esters and anhydrides. Similarly, aconitic acid, glutaconic acid, quinone, naphthoquinone, toluquinone, phorone, benzolacetone, mesityl oxide, piperic acid, ketenes, dibenzylidene acetone, and their homologs and analogs may be employed.

The amount of oxygen-yielding polymerization catalyst to be introduced into the condensation reaction mixture should be sufficient to effect resinification of the materials. This is generally of the order of about 0.001 mol to about 0.025 mol per mol of olefinic material present. Peroxides in general, especially organic peroxides such as benzoyl peroxide, acetylbenzoyl peroxide, diamyl peroxide, etc., are suitable catalysts.

The condensation is carried out by mixing the reactants and the catalyst together and heating the reaction mixture for about one to about three hours at a temperature of about 160° C. to about 240° C. The mixture is preferably agitated during the heating, and the condensation may be carried out at atmospheric or at superatmospheric pressures. Although efficient operation may suggest the use of stoichiometric proportions of the reactants, variations in proportions may be employed as desired.

Upon completion of the reaction, the reaction mixture may be distilled, preferably under reduced pressure, to remove unreacted materials, and the undistillable residue comprises the polymeric condensation product. When this residue has cooled, it forms a clear, brittle, solid resin, insoluble in water or methyl alcohol but soluble in alkalies.

While still in the molten state, various adjuvant materials may be admixed with the resinous material, including fillers, dyestuffs, etc., depending upon its ultimate use. The resin produced has improved thermo-hardening properties and may be employed in coating compositions, waterproofing agents, stabilizers, adhesives, waxes, paints, impregnating materials, fat liquors, etc. Wrapping materials for food products, cosmetics, soaps and toilet articles may be produced therefrom.

The following examples, described herein, are merely illustrative of the present invention, and it will be understood that the invention is not limited thereto.

Example I

About 200 parts by weight of hexadecene-1 containing peroxide naturally-occurring therein is mixed with 30 parts of maleic anhydride (approximately 3 mols of the hydrocarbon to 1 mol of the unsaturated anhydride) and the mixture is heated with continuous stirring over a period of about twenty minutes to dissolve the maleic anhydride. Heating and agitation are continued for about an hour longer, the temperature being maintained at about 180° C. to about 190° C. The reaction mixture on cooling is a homogeneous, straw-colored, viscous liquid.

The product thus obtained is subjected to a reduced pressure equivalent to one millimeter of mercury, and a distillate comprising 1 part of unreacted maleic anhydride and about 135.7 parts of unreacted hexadecene is recovered. An extremely viscous undistillable liquid remains in the distillation vessel. This undistillable residue cools to a hard, brittle resin insoluble in methanol, the yield of the higher polymeric condensation product thus produced being about 98.5%, based upon the amount of hexadecene reacted.

Example II

About 25 parts by weight of peroxide-free hexadecene-1 is added to 11 parts of maleic anhydride (about 1:1 in mols). About 0.25 part of benzoyl peroxide (approximately 0.01 mol per mol of the hydrocarbon) is then introduced into the mixture, and the resulting reaction mixture is heated with agitation at about 172° C. for approximately an hour and a half. The reaction mixture when cold is a light-brown semi-solid. This is distilled at a pressure equivalent to one millimeter of mercury, and a distillate comprising 4.4 parts of unreacted maleic anhydride and 10.4 parts of unreacted hexadecene is recovered. The residue comprising the higher polymeric condensation product cools to a brittle brown solid soluble in aqueous alkali but insoluble in methanol.

Although the present invention has been described with respect to particular embodiments and examples, it will be apparent to those skilled in the art that variations and modifications of this invention can be made and that equivalents can be substituted therefor without departing from the principles and true spirit of the invention. Thus, while the present invention has set forth a method of providing polymeric condensation products substantially free of monomers, it will be appreciated by those skilled in the art that the recognition of the effect of the presence of peroxides and other oxygen-yielding polymerization catalysts upon the type of condensation product produced enables the operator to determine in large degree the proportion of higher polymers to monomer in his product. Starting with olefinic materials which are peroxide-free and producing products which are predominantly monomeric, one may increase the amount of peroxide introduced to reduce the proportion of monomer in the product to any point desired.

We claim:

1. A process for producing polymeric condensation products which comprises heating to reaction temperature hexadecene-1 with maleic anhydride in the presence of an amount of an organic peroxide catalyst sufficient to effect resinification during said reaction, said organic peroxide catalyst being present within the range of 0.001 to 0.025 mol per mol of said hexadecene-1, and the reaction being carried out by heating the mixture at a temperature of 160° to 240° C. for from one to three hours.

2. A process for producing polymeric condensation products comprising reacting a mixture consisting essentially of normal straight chain mono-olefins selected from the group consisting of decene, dodecene, hexadecene and docosene, and a compound containing the alpha-beta-enal group C=C—C=O and having up to seven carbon atoms per molecule, the reaction being carried out by heating said mixture from 1 to 3 hours at a temperature of 160° to 240° C. in the presence of an organic peroxide catalyst within the range of 0.001 to 0.025 mol per mol of the olefin to produce a polymeric resinous reaction product without substantial formation of monomeric condensation products.

3. A process of producing complex resinous condensation products substantially free from simple monomeric condensation products which comprises heating for about 1 to 3 hours at a temperature of 160° to 240° C. a mixture consisting essentially of normal straight chain mono-olefins selected from the group consisting of decene, dodecene, hexadecene and docosene, and a compound containing the alpha-beta-enal group C=C—C=O and having up to seven carbon atoms per molecule in the presence of a peroxide polymerization catalyst within the range of 0.001 to 0.025 mol per mol of the olefin, and distilling off unreacted materials to leave a resinous complex condensation product.

JOHN ROSS.
ARTHUR IRA GEBHART.

REFERENCES CITED

The following references are of record in the file of this patent:

UNITED STATES PATENTS

| Number | Name | Date |
|---|---|---|
| 2,055,456 | Eichwald | Sept. 22, 1936 |
| 2,378,629 | Hanford | June 19, 1945 |
| 2,383,399 | Lundquist | Aug. 21, 1945 |
| 2,391,162 | Huebner et al. | Dec. 18, 1945 |
| 2,411,599 | Sparks et al. | Nov. 26, 1946 |
| 2,452,700 | Tawney | Nov. 2, 1948 |